United States Patent [19]
Ross

[11] Patent Number: 5,241,412
[45] Date of Patent: Aug. 31, 1993

[54] MAGNETO-OPTIC DEVICE WITH REFLECTIVE CONDUCTOR

[75] Inventor: William E. Ross, Woodland Hills, Calif.

[73] Assignee: Litton Systems, Inc., Beverly Hills, Calif.

[21] Appl. No.: 867,423

[22] Filed: Apr. 13, 1992

[51] Int. Cl.[5] .............................................. G02F 1/09
[52] U.S. Cl. .................................... 359/280; 359/282; 359/284
[58] Field of Search ............... 359/280, 281, 282, 283, 359/284

[56] References Cited

U.S. PATENT DOCUMENTS

| | | |
|---|---|---|
| 3,508,215 | 4/1970 | Cohler et al. .................... 359/282 |
| 4,114,191 | 9/1978 | Lund . |
| 4,497,545 | 2/1985 | Ross ................................ 359/282 |
| 4,550,983 | 11/1985 | Ross ................................ 359/282 |
| 4,563,236 | 1/1986 | Ross et al. . |
| 4,578,321 | 3/1986 | Ross et al. . |
| 4,578,651 | 3/1986 | Heitmann et al. ............... 359/282 |
| 4,584,237 | 4/1986 | Pulliam ........................... 359/282 |
| 4,608,535 | 8/1986 | Tada et al. ....................... 359/282 |

FOREIGN PATENT DOCUMENTS 1180334 2/1970 United Kingdom .

OTHER PUBLICATIONS

Ross et al, "Advanced Magneto-Optic Spatial Light Modulator Device Development," *SPIE Proc.*, vol. 1562, pp. 93 to 102, 1991.

Hill et al, "Fast Switchable Magneto-Optic Memory—Display Components," *Philips Journal of Research*, vol. 33, Nos. 5-6, 1978, pp. 211 to 225.

*Primary Examiner*—Martin Lerner
*Attorney, Agent, or Firm*—Donald J. Ellingsberg

[57] ABSTRACT

A reflective mode, magneto-optic spatial light modulator (MOSLM) device has one or more pixel elements formed from a selected magneto-optic material with a respective pair of coincident current select electrical conductors associated with each pixel where at least one of the conductors is planar and thereby develops a reflector surface that reflects incident radiation, such as polarized light of an optical beam, which has passed at least through an associated pixel back through the magneto-optic material and resident single magnetic domain of the pixel.

4 Claims, 2 Drawing Sheets

MAGNETO-OPTIC DEVICE WITH REFLECTIVE CONDUCTOR

CROSS-REFERENCE TO RELATED APPLICATION

U.S. patent application Ser. No. 07/867,422, filed Apr. 13, 1992 even date herewith and titled "Reflective Magneto-optic Device with an Embedded Conductor Channel" by William E. Ross and David N. Lambeth, and assigned to the same assignee as the present invention.

COPYRIGHT MATERIAL

The description of the invention contains material which may be the subject of copyright protection. Reproduction of the patent document as it appears in the United States Patent and Trademark Office is permitted in furtherance of the United States Patent Laws (Title 35 United States Code). The copyright owner of this material reserves all other rights under the United States Copyright Laws (Title 17 United States Code).

BACKGROUND OF THE INVENTION

1. Field of the Invention

A reflective mode, magneto-optic spatial light modulator (MOSLM) device has at least one planar electrical conductor which functions both as an optical mirror surface and as the address conductor for random access, selective switching of an associated individual pixel element which is formed from a magneto-optic material that exhibits magnetic domain characteristics.

2. Description of Related Art

In the field of magneto-optic devices, materials that exhibit magnetic domain characteristics, the behavior of such magnetic domains, and the use of these magnetic domain materials in sensing and display devices have been described: see U.S. Pat. No. 4,563,236; U.S. Pat. No. 4,578,321; and, U.S. Pat. No. 4,550,983 all assigned to the same assignee as this invention.

Magneto-optic display devices can employ the Faraday effect which depends on the change in rotation of the plane of polarization of electromagnetic radiation, such as polarized light, as it is transmitted through a magnetic domain. In accordance with the Faraday effect, if the transmitted radiation is plane polarized, passed through a magnetic domain, and then through an analyzer, the intensity of the radiation which has been so transmitted is either greater than or less than that radiation which is transmitted through adjoining domains. This resulting contrast in radiation intensities is the basis for magneto-optic display devices.

The MOSLM TM device, which functions like a magneto-optic device, has become very popular as an electrically addressed spatial light modulator (SLM) for optical correlation and pattern recognition. (Ross, W. E. and Lambeth, D. N., "Advanced Magneto-optic Spatial Light Modulator Device Development", SPIE Proc., Vol. 1562, pp. 92 to 102, 1991.) The MOSLM device depends upon the use of a LIGHT MOD TM modulator (a product of Litton Systems, Inc.) The acronym LIGHT MOD identifies this modulator as a Litton Iron Garnet H (Magnetically) Triggered Magneto Optical Device which differentiates it from thermally triggered devices such as the magnetooptical modulator of U.S. Pat. No. 4,578,651.

The LIGHT MOD SLM like other magneto-optic devices, is electrically addressable and changes or switches the direction of magnetization M of a magnetic material formed into individual pixel or post elements through electrical conductors or drive lines that establish a magnetic field having an opposite direction of magnetization. (Hill, B. And Schmidt, K. P., "Fast Switchable Magneto-Optic Memory Display Components", Phillips Journal of Research, Volume 33, Nos. 5/6, 1978, page 211; and U.S. Pat. No. 4,114,191). An external bias field may be required (U.S. Pat. No. 4,114,191) or it may be omitted (United Kingdom Patent No. 1,180,334). When a magnetic field is established having a strength equal to or greater than Hk-4$\pi$ Ms, the reversal of the direction of magnetization or switching occurs.

This process of switching involves two parts: nucleation of a domain wall and the movement or propagation of the domain wall toward or to complete saturation. A magnetic domain wall is established by nucleation at a nucleation site within the magnetic material of the selected post element. This domain wall is formed between the initial condition of magnetization and the nucleated opposite magnetic condition. The remainder of the element is switched by propagating the domain wall through the thickness of the pixel element so that part or all of the entire element exhibits a direction of magnetization opposite to the initial condition, i.e., partial or complete saturation.

It is known that the magnetic field required for nucleation is greater than that required for propagating the domain wall because wall motion is limited by demagnetizing and coercivity effects. The field established by the selected row-and-column conductors diminishes rapidly as the distance from the conductors increases. Thus, it is understood that the value or strength of the magnetic field adjacent to the energized conductors is large while the field in the region of the post element farthest from the energized conductors is relatively small.

The MOSLM device like the LIGHT MOD SLM is made from a magneto optic film which is a high bismuth content, iron garnet film having a large lattice constant (a product of Litton Systems, Inc.) The bismuth substituted, transparent iron garnet film is grown on a non magnetic substrate, and has its direction of uniaxial anisotropy oriented perpendicular to the plane of the film of magnitude greater than the saturation magnetization of the film. The high bismuth content of this film enhances its optical characteristics and results in a softer garnet which facilitates ion mill structuring using a photo resist process. The film is structured into an array of pixel elements by etching completely through the magnetic film to a non-magnetic substrate. Each pixel or element can be made to function as a valve to the passage of electromagnetic radiation, such as polarized light, by changing or switching the magnetization state of the selected pixel. This state change is initiated by the action of combined magnetic fields through coincident current select of paired electrical conductors at a selected pixel element.

The LIGHT-MOD SLM and MOSLM device are acceptable magneto-optic lens; however, there is a continuing requirement in applied research and prototype developments, leading to production units, for improvements to be made; particularly for improved lens to be used in a reflective rather than transmissive mode.

OBJECTS OF THE INVENTION

Accordingly, it is an object of the invention to provide a new and improved reflective magneto-optic spatial light modulator (MOSLM) device.

It is an object of the invention to provide a new and improved MOSLM device that operates in the reflective mode utilizing the Faraday effect.

It is an object of the invention to provide a MOSLM device having an increased magneto-optic effect with reduced drive currents for magnetic domain reversal.

It is an object of the invention to provide a MOSLM device having an increased magnetic field adjacent to a nucleation site for initiating magnetic domain reversal.

It is an object of the invention to provide a MOSLM device having reduced magneto-optic material film thickness with a corresponding reduction in transition time for magnetic domain reversal, and no decrease in device efficiency.

It is an object of the invention to provide a MOSLM device having reduced magneto-optic material film thickness permitting reduced pixel size with smaller gaps therebetween which results in higher resolution.

It is an object of the invention to provide a new and improved reflective MOSLM device having increased resolution.

SUMMARY OF THE INVENTION

Briefly, in accordance with one form of the invention, a reflective mode, magneto-optic spatial light modulator (MOSLM) device has a plurality of individual pixel elements formed from magneto-optic material and supported by a nonmagnetic substrate, where both the elements and the substrate are optically transparent to incident radiation, such as light, that passes at least through a selected pixel and is reflected back through the pixel by the planar surface of at least one conductor of respective pairs of coincident current select conductors.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings(s).

DESCRIPTION OF THE INVENTION

Figure 1:
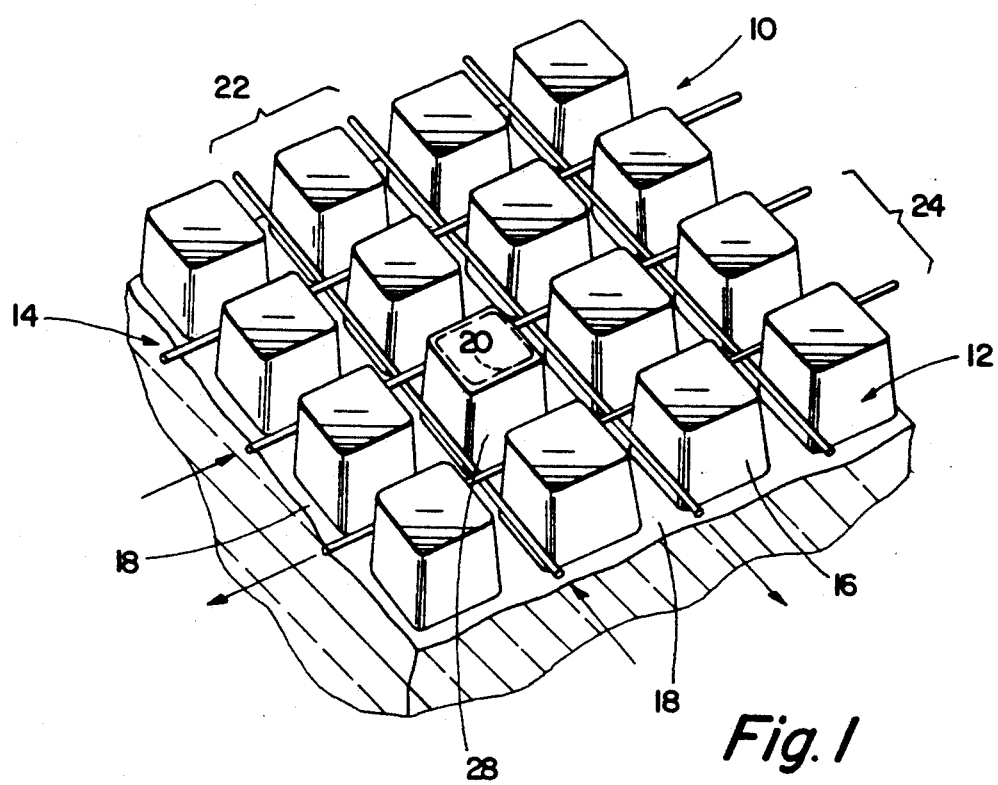
FIG. 1 is an enlarged perspective view of a PRIOR ART form of magnetic domain device.

A PRIOR ART form of magnetic domain lens known as the Litton Iron Garnet H. Triggered Magneto-optic Device (LIGHT-MOD) 10 is shown by FIG. 1. The LIGHT-MOD TM lens 10 has a film layer 12 and a film layer support or substrate material 14. The film layer 12 is a relatively thin layer of magneto-optic material selected to exhibit selected magnetic domain characteristics. Such magneto-optic material can be a ferrimagnetic garnet composition; for example, a bismuth substituted iron garnet. The film support material of substrate 14 can be relatively thick compared to the film layer 12, and is selected to exhibit nonmagnetic and optically transparent characteristics. The material of substrate 14 can have the same single crystal structure as the magneto-optic material of film layer 12. For example, the film support material of substrate 14 can be a garnet substrate such as gadolinium gallium garnet (GGG).

The film layer 12 of the PRIOR ART LIGHT-MOD lens 10 has a plurality of geometric elements or "pixels" 16 separated by grooves 18 in a row-and-column orientation as shown by FIG. 1. The geometric elements 16 can be formed by ion beam etching the grooves 18 into the film layer material 12. It is contemplated that the grooves 18 can also be formed using a wet chemical or reactive dry etch process. Each of the geometric elements or pixels 16, are formed from a volume of magneto-optic material sufficient to constrain a single, intrinsic magnetic domain that is bistable, i.e. magnetically reversible. One such magnetic domain physically constrained by a geometric element is schematically represented at 20 by FIG. 1 where the "easy axis" of the magnetic domain 20 is perpendicular to the perspective plane of the drawing.

The LIGHT-MOD lens 10 is a passive device; that is, it requires an external source of illumination. Its operation is non-volatile. Once written, a pattern will remain on the device until it is erased or changed. It is not affected by Earth's magnetic field or normal fields from electric equipment.

The LIGHT-MOD lens 10 operates on the principle of optical Faraday rotation. Plane polarized light in passing through the magnetized film has its plane of polarization rotated clockwise for positive magnetic polarity, and counterclockwise for negative magnetic polarity. Thus the magnetic state of the individual magnetic film pixel 16 affects the orientation of the plane of polarization of the light that passes through it.

The PRIOR ART LIGHT-MOD lens 10 as shown by FIG. 1 has a plurality of row and column conductor loops, similar to conductor loops 22 and 24, positioned to act upon each of the geometric elements 16. The row and column conductor loops 22 and 24 are positioned in the grooves 18 between adjacent pixels 16. (For another example of LIGHT-MOD lens, see U.S. Pat. No. 4,550,983 granted Nov. 5, 1985 for MAGNETO-OPTIC DEVICE FOR THE CONTROL OF ELECTROMAGNETIC RADIATION by William E. Ross and assigned to the same assignee.)

The matrix of row and column conductor loops, similar to conductor loops 22 and 24, as shown by FIG. 1 permit the application of a magnetic field to a pixel element by coincident current select of conductor (or transmission) line pairs that here include a selected pixel element 28.

An electric current passes through each of the selected conductor loops 22 and 24 in the directions indicated by the arrows. If the magnetic field produced at selected geometric element 28 is the same magnetic polarity as the magnetic domain 20, there is no magnetic reversal of the magnetic orientation of the magnetic domain. Where the magnetic field produced at the selected geometric element 28 is of opposite magnetic polarity to that of the magnetic domain, there is a magnetic reversal of the magnetic domain 20; in essence, magnetic domain reversal at the coincidence of conductor loops 22 and 24. This reversal or switching from one state to the other by coincident current pulses is an addressing technique similar to that used for magnetic core memories Current pulses as short as 10 nanoseconds and of a peak amplitude of 150 ma can be used. A bias coil surrounding the array can also be used since this aids the switching process, and it may also be used for "bulk" erase.

Figure 2:
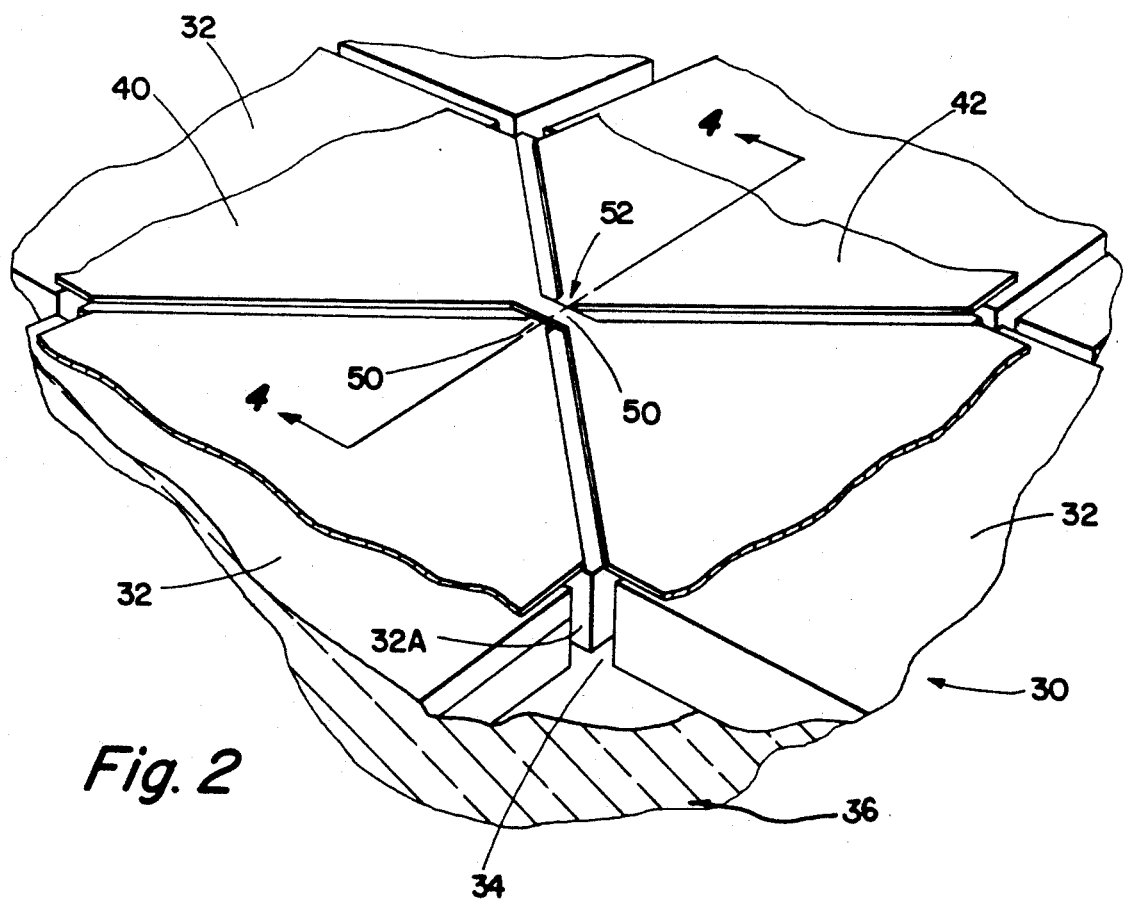
FIG. 2 is an enlarged perspective view of one form of a magneto-optic spatial light modulator (MOSLM) device of the invention.

One form of magneto-optic spatial light modulator (MOSLM) device 30 of the invention is shown by FIG. 2. As in the PRIOR ART magnetic domain lens 10 of FIG. 1, MOSLM device 30 preferably has a plurality of similar pixel elements 32 each of which is separated by similar grooves 34, arranged as shown in a row-and-column (x- and y-) orientation, and supported by a substrate 36. Other geometric orientations of these pixel elements are contemplated; for example, a diagonally arranged configuration where the x- and y- axes are rotated 45° from that of FIG. 2. Each of the pixel elements 32 is preferably formed from a predetermined volume of magneto-optic material that is sufficient to constrain a single, intrinsic magnetic domain which is bistable; i.e., its direction of magnetic orientation is reversible. One such magnetic domain (not shown but like magnetic domain 20 of FIG. 1 as described above) is physically constrained by pixel element 32A of FIG. 2. Again, the easy axis of this magnetic domain (as well as those individually contained within the other pixel elements 32) is perpendicular to the perspective plane of the drawing.

One pair of electrical conductors 40 and 42 are formed in accordance with the MOSLM device 30 of the invention as shown by FIG. 2. Unlike the PRIOR ART electrical conductors 22 and 24 of FIG. 1, the electrical conductors 40 and 42 for the MOSLM device 30 are not positioned, either partially or totally, within the grooves 34 formed between the pixel elements 32 of FIG. 2. Rather, conductors 40 and 42 are preferably planar and positioned in the row-and-column orientation as shown to cover not only the pixel element, for example pixel element 32A, but also all or selected portions of its adjacent grooves 34. Grooves 34 can be filled with a suitable opaque material 38 such as polyamide as shown by FIG. 4.

Conductors 40 and 42 are formed from an electrically conductive material such as gold or silver. It is contemplated that copper as well as aluminum can also be used. The conductors are electrically insulated from each other by an insulator layer 44 as shown more clearly by FIG. 4. One insulator material can be silicon dioxide ($SiO_2$).

Figure 3:
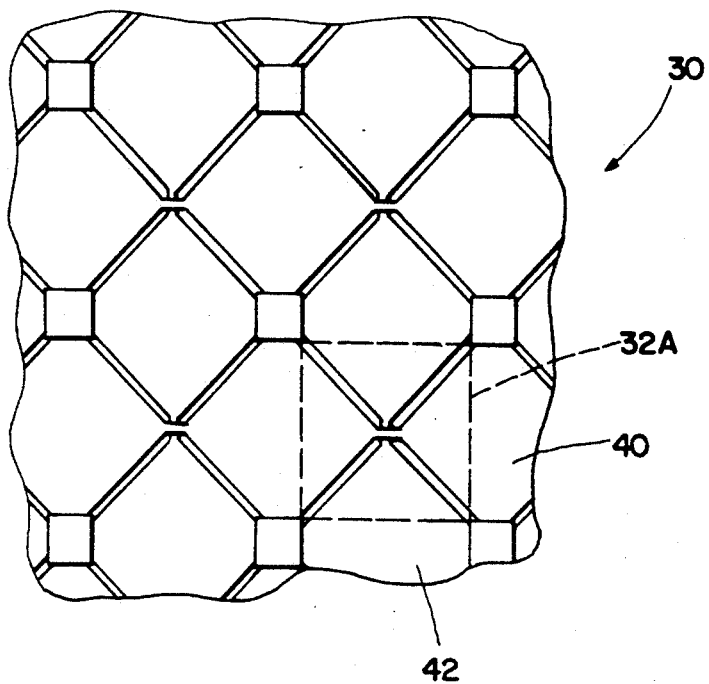
FIG. 3 is a reduced plan view of a larger portion of the MOSLM device of FIG. 2.

The MOSLM device 30 of the invention, as shown by FIGS. 2 and 3, has each of the electrical conductors (the x- and y- conductors 40 and 42 are representative of similar conductors) suitably formed with a necked or reduced portion 50 which cooperate to develop a crossover region 52. This resulting configuration of the conductors can be referred to as a "bow tie" pattern. As can be seen from FIG. 3, this bow tie pattern develops a diamond mosaic in plan that is characteristic of this form of MOSLM device 30.

Figure 4:
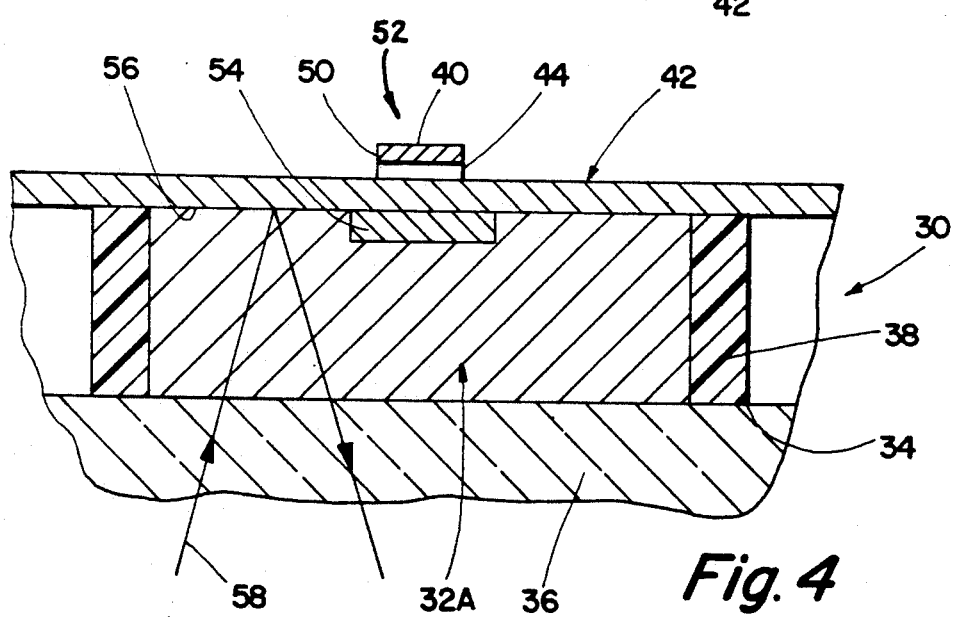
FIG. 4 is an enlarged, cross section of the MOSLM device of FIGS. 2 and 3 along the sectional line 4—4.

Referring to FIG. 4, pixel element 32A constrains a single, intrinsic magnetic domain, like magnetic domain 20 of the PRIOR ART magnetic domain lens 10 of FIG. 1, that is bistable, i.e. magnetically reversible. As taught by U.S. Pat. Nos. 4,550,983 and 4,578,321, coincident current select of conductors 40 and 42 will create an external magnetic field that is centered or focused at the crossover region 52. The crossover region 52 adjoins and coincides with a nucleation site 54 that is formed in the magneto-optic material of pixel 32A. The nucleation site 54, which can also be referred to as a "magnetic domain nucleate generator region", is formed by known ion implantation processes.

The planar conductors, such as conductors 40 and 42, of MOSLM device 30 not only enable coincident current select of one or more pixels, such as pixel 32A, but also develop a highly reflective surface 56 directed toward an associated pixel element such as pixel 32A (see FIG. 4.) Incident radiation 58, such as polarized light of an optical beam, passes through the magneto-optic material of pixel 32A and is reflected by surface 56 to pass for the second time through the material of pixel 32A. This reflective mode of operation doubles the magneto-optic effect of MOSLM device 30 when compared to known transmissive magnetic domain lens as represented by PRIOR ART magnetic domain lens 10 of FIG. 1.

This structure of MOSLM device 30 enhances producibility by halving both film growth time and etching time since the reflective mode halves the film thickness required for an equivalent transmissive magneto-optic lens device; the film thickness is equivalent to the height of the pixel elements 32 formed on substrate 36 as shown by FIG. 2. Further, thinner film corresponds to narrower gaps, i.e., grooves 34, between pixels 32. It also reduces switching or transition time; the time required to complete the reversal of magnetic orientation of the magnetic domain within a selected pixel. The central location of a nuceleation site, such as site 54 in pixel element 32A of FIG. 4, further reduces magnetic domain transition time and enhances resolution by eliminating pixel corner radiation, e.g., light scattering. This permits better photolithography for structuring the reduced portions, such as portions 50 as shown by FIG. 2, at the nucleation site 54 which is shown by FIG. 4.

Since the magnetic field is established by and adjacent to a conductor and is proportional to the select current value, the smaller conductors of MOSLM device 30 require lower drive currents with lower electrical power dissipation.

Figure 5:
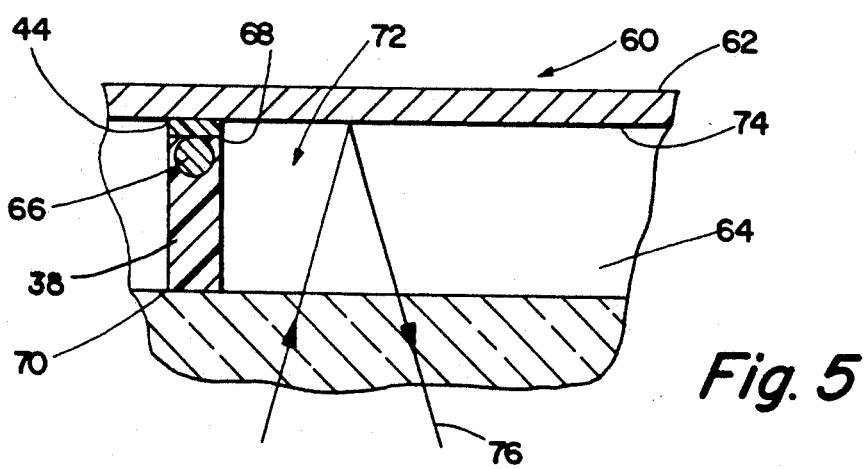
FIG. 5 is an enlarged, cross section of another form of MOSLM device of the invention.

Another form of MOSLM device 60 is shown by FIG. 5. MOSLM device 60 is similar both functionally and structurally to MOSLM device 30 of FIGS. 2 and 4. However, MOSLM 60 has a single planar electrical conductor 62 that covers pixel element 64. The second coincident current select conductor 66 can be a conventional round wire with a generally circular cross rectangular or square section, i.e., a nonplanar surface. Conductor 66 can be located at the edge 68 of pixel 64. Although conductor 66 is positioned within groove 70 as shown by FIG. 5, it is contemplated that the conductor could be adjacent to the edge 68 but not positioned within the groove in the same or substantially the same plane as Conductor 62. Like MOSLM device 30, conductors 62 and 66 permit coincident current select with its resulting establishment of an external magnetic field. Pixel 64 has a nucleation site 72 formed at or near edge 68 where the external magnetic field is focused in the MOSLM Device 60.

The planar conductor 62 of MOSLM device 60 also develops reflective surface 74 directed toward pixel 64. Again like MOSLM device 30, incident light 76 is reflected by conductor surface 74 to develop the reflective mode of operation as described for MOSLM device 30.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A magneto-optic spatial light modulator (MOSLM) device having at least one pixel element formed from a predetermined volume of magneto-optic material, which exhibits magnetic domain characteristics, and altered to develop a nucleation region; the pixel element supported by a nonmagnetic material where both materials are optically transparent to incident radiation such as visible light; and, further having coincident current select electrical conductors orthogonally positioned to act upon the pixel element to selectively establish a preferred direction of magnetic orientation in a magnetic domain contained within the material of the pixel element, CHARACTERIZED IN THAT the electrical conductors comprise:

a) at least one conductor of a pair of conductors supported by the associated pixel element and electrically insulated from the other conductor of said pair, b) each of said pair of conductors having a generally planar surface that is optically opaque to the incident radiation and which develops mirror means to reflect the incident radiation, and c) respective ones of said pair of conductors having a complementary necked, crossover portion adjacent to the nucleation region to initiate a desired reversal of magnetic orientation of the magnetic domain upon the coincident current select of said pair of conductors.

2. The MOSLM device of claim 1 in which said reversal is propagated to the selected direction of magnetic orientation.

3. The MOSLM device of claim 1 in which said nucleation region adjoins said complementary necked crossover portion within the pixel element volume.

4. The MOSLM device of claim 1 in which said nucleation region is an ion implant region to facilitate initiation of desired magnetic domain reversal.

* * * * *